July 1, 1952 — E. A. IRVINE — 2,601,885
TRAVELING EQUIPMENT FOR BABIES
Filed March 25, 1947 — 8 Sheets-Sheet 2
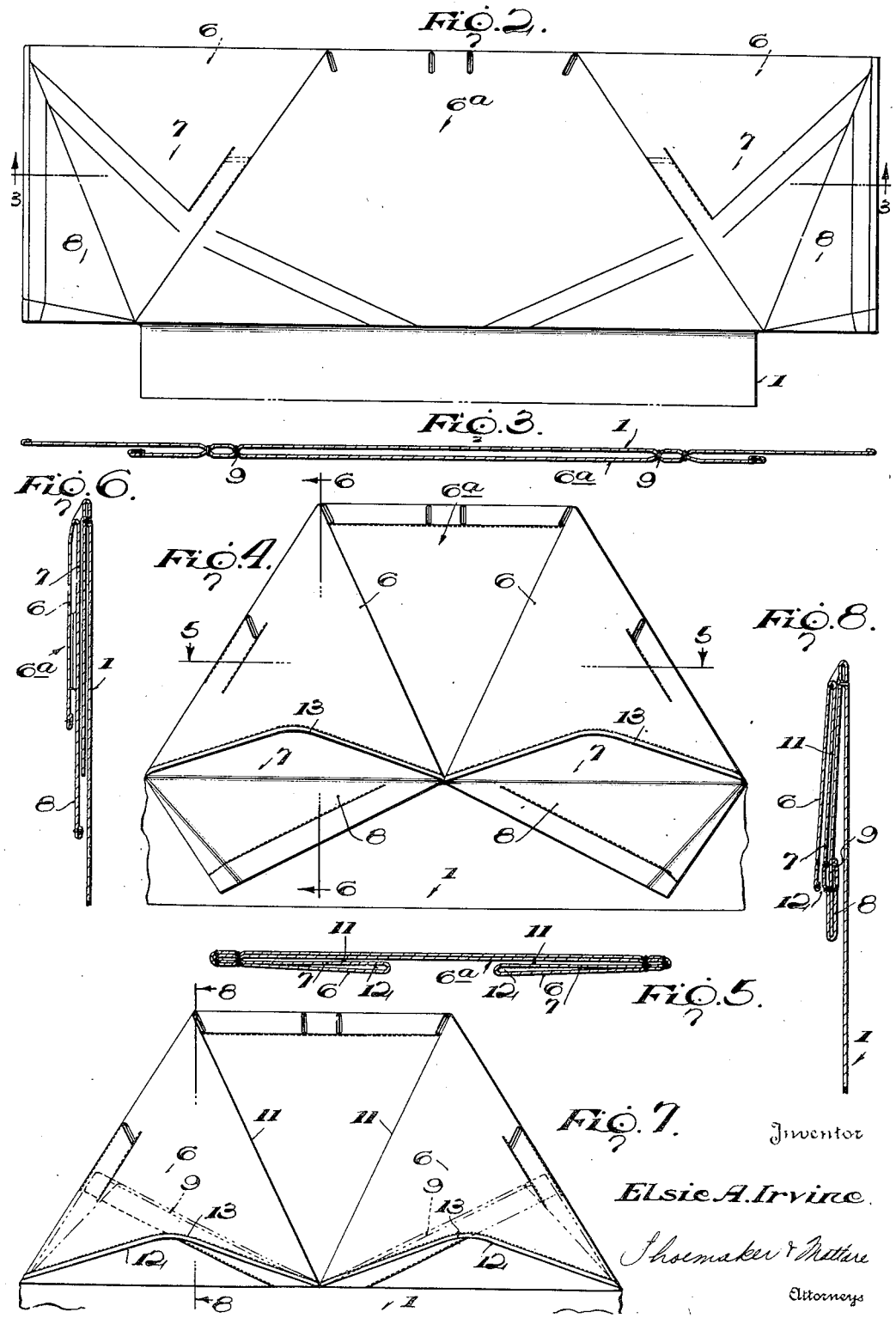

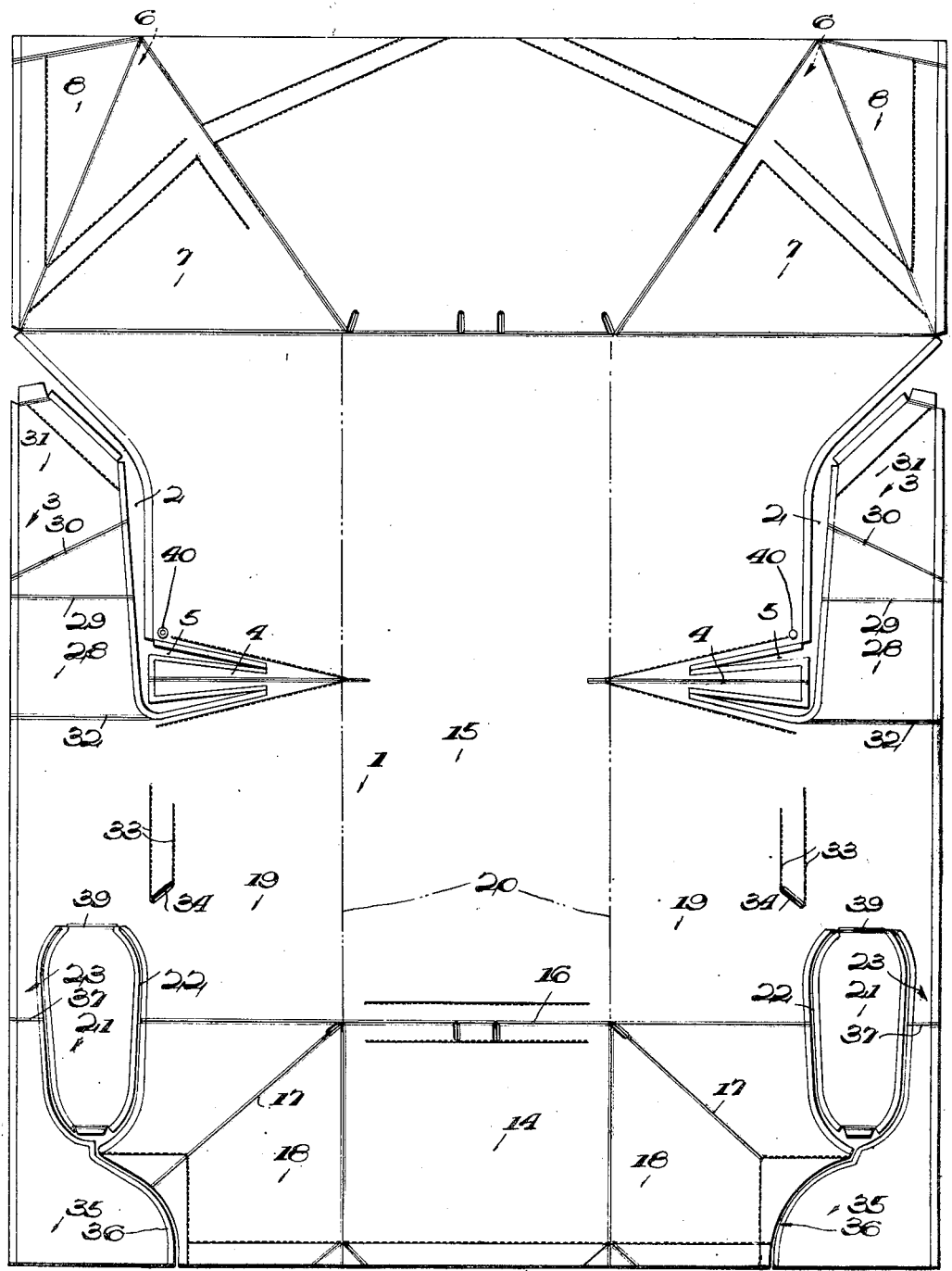

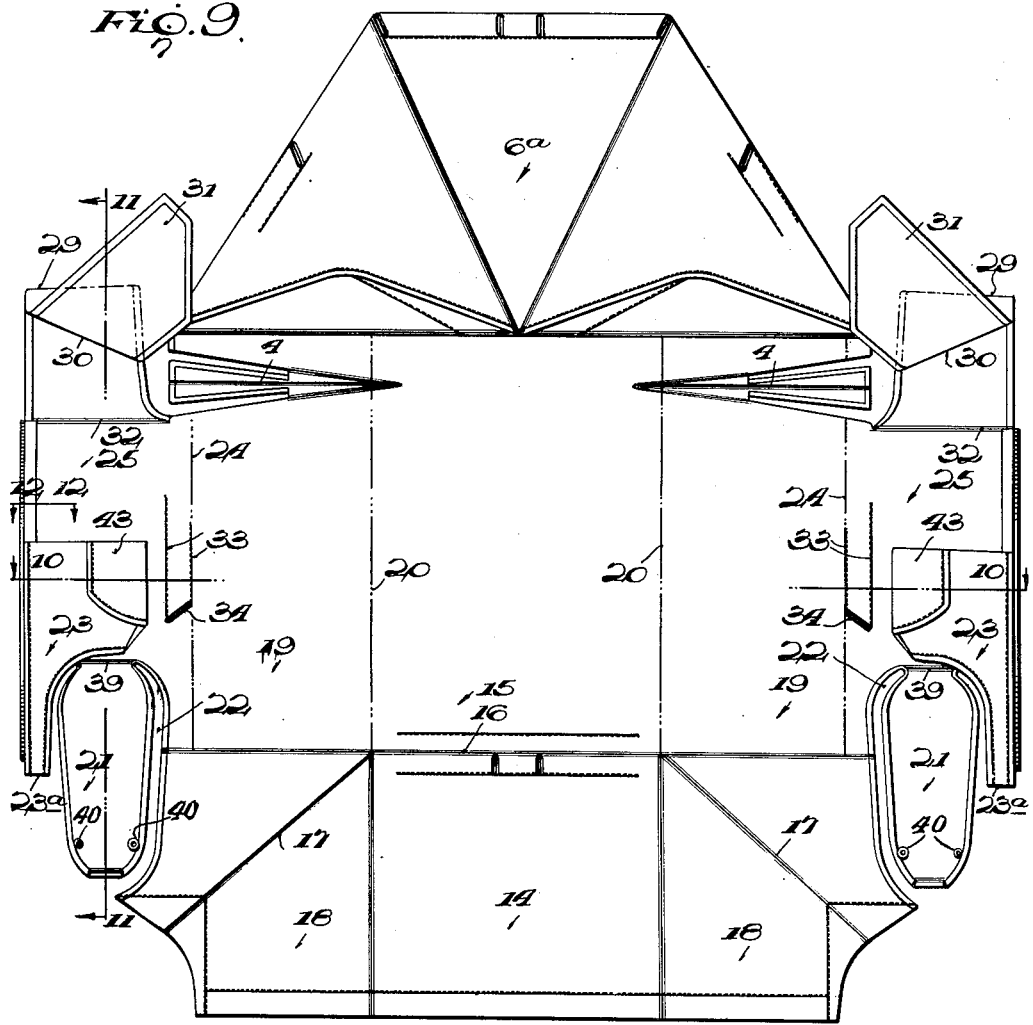

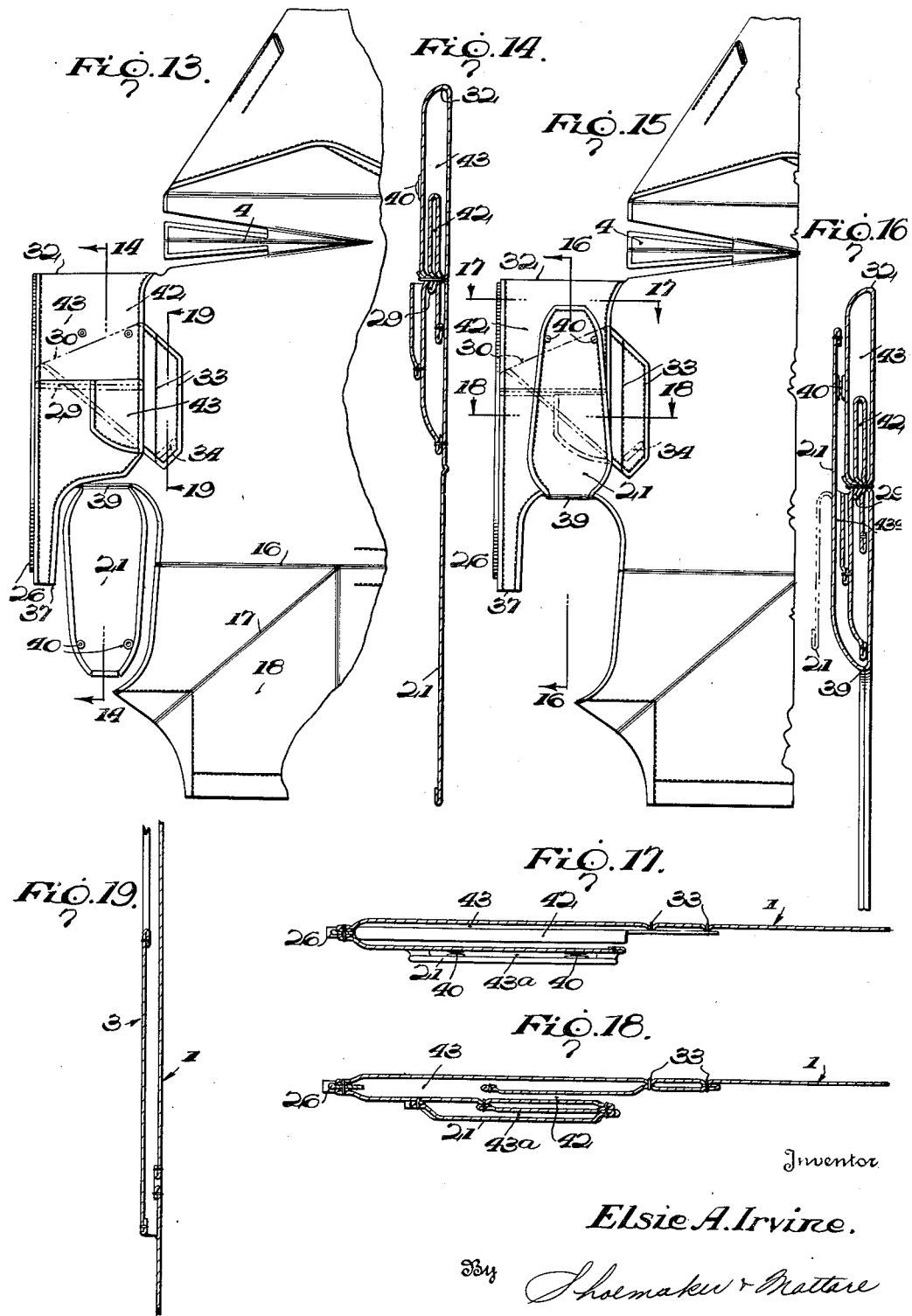

July 1, 1952           E. A. IRVINE           2,601,885
TRAVELING EQUIPMENT FOR BABIES
Filed March 25, 1947           8 Sheets-Sheet 5
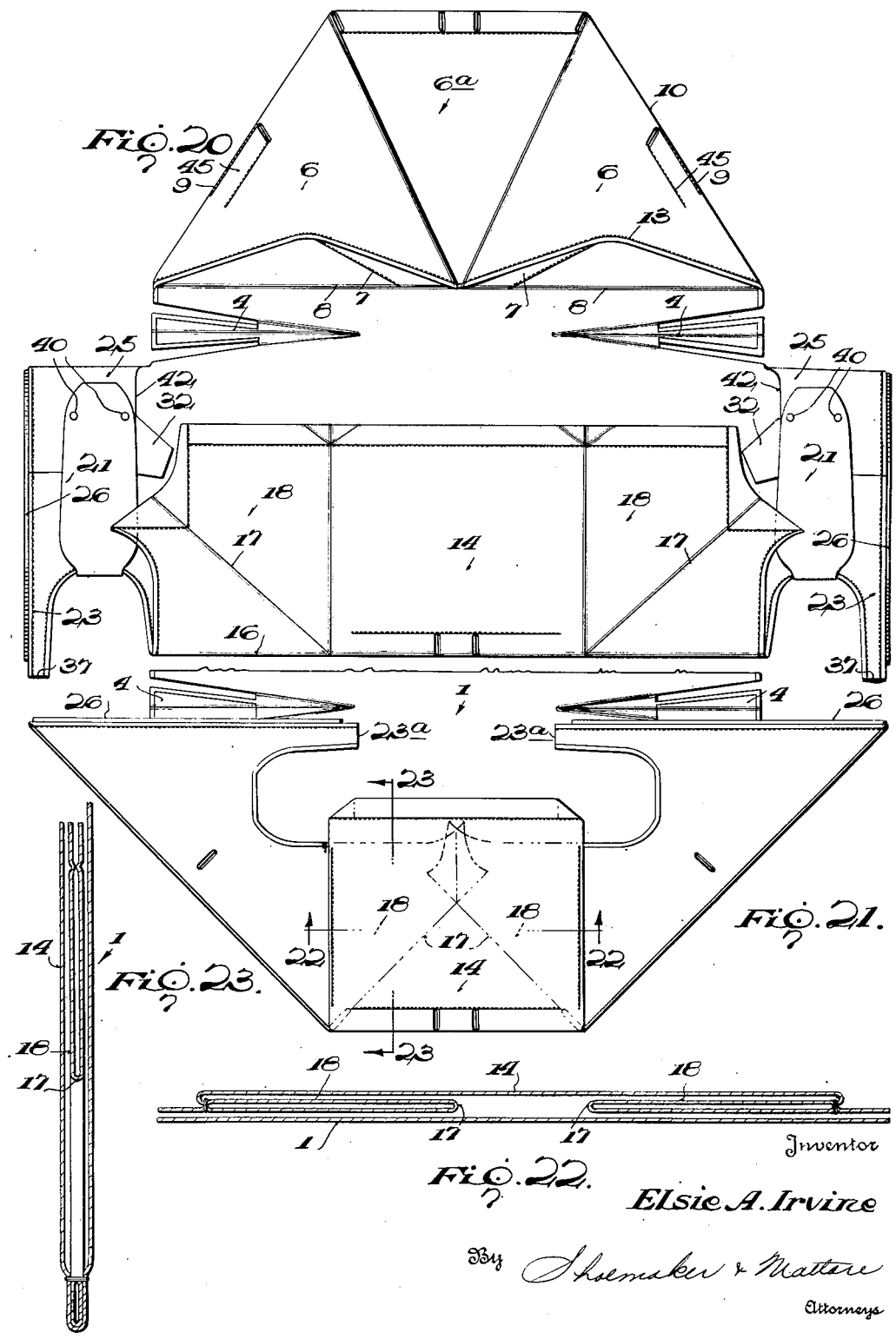

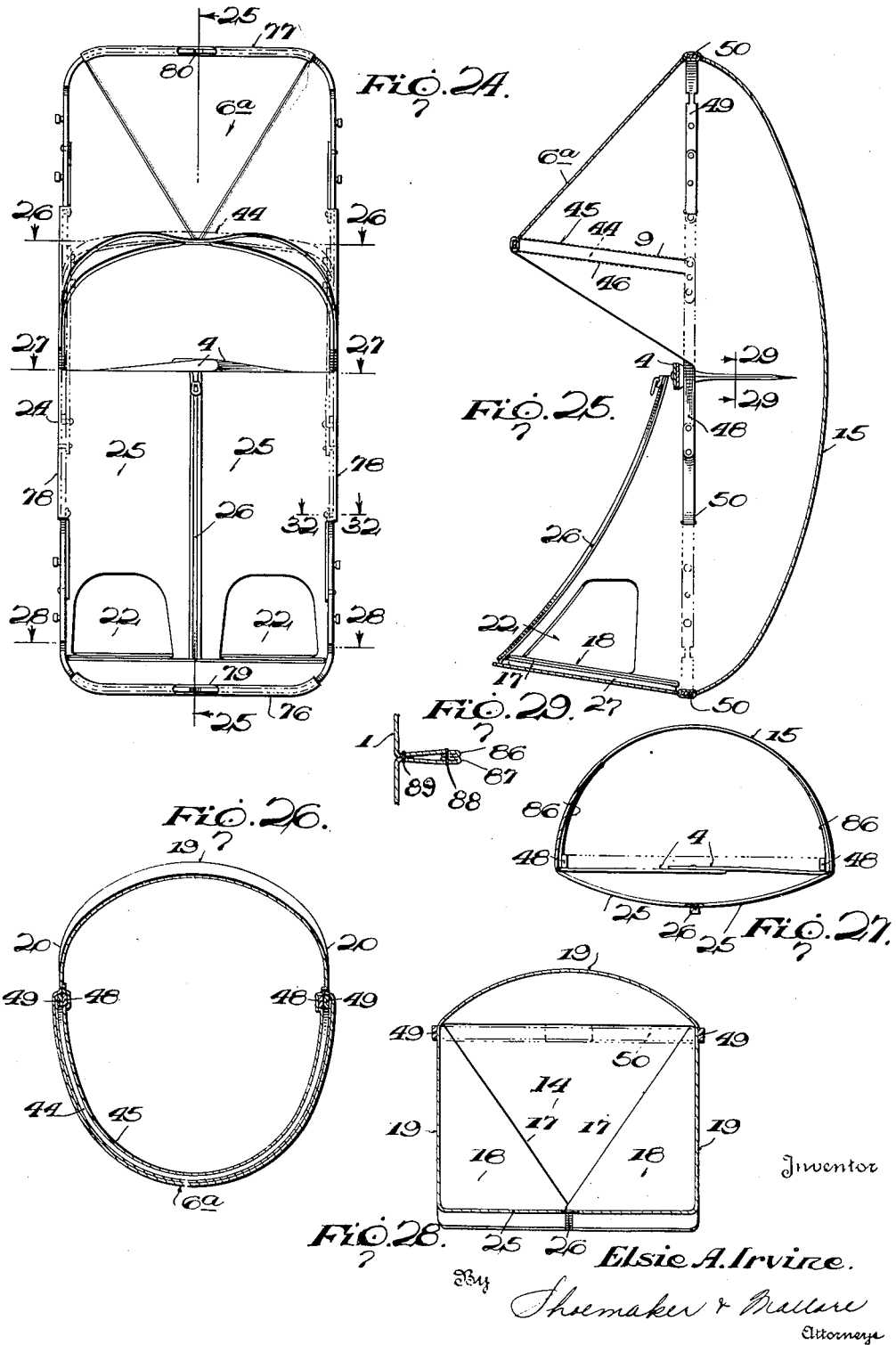

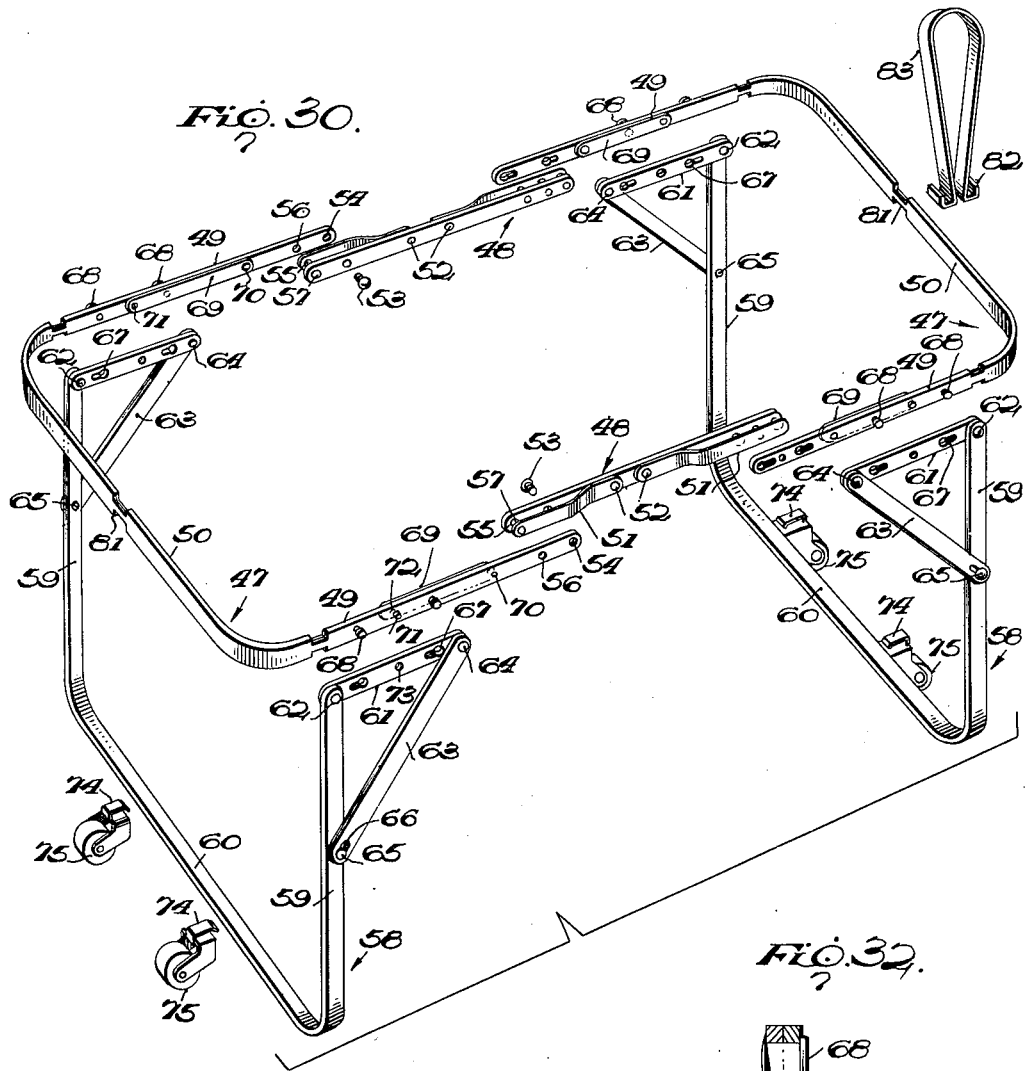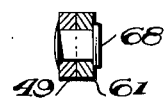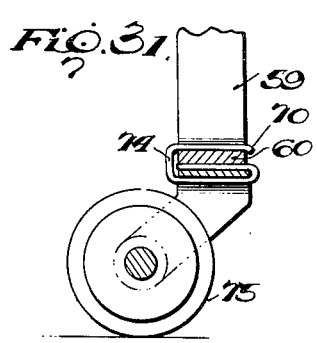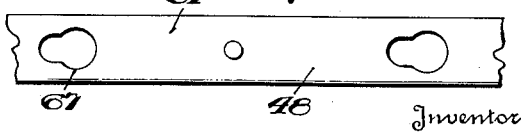

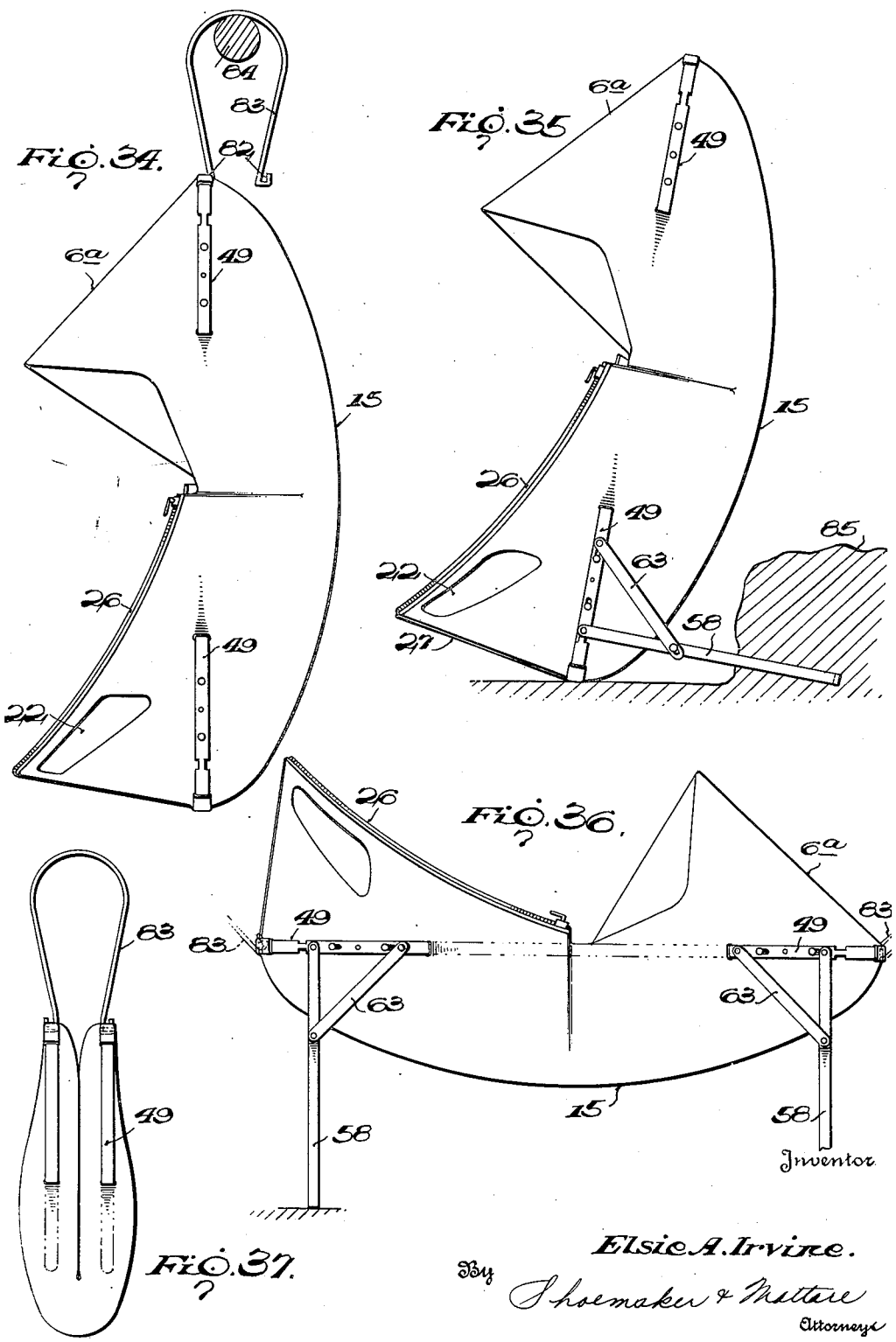

Patented July 1, 1952

2,601,885

UNITED STATES PATENT OFFICE 2,601,885

TRAVELING EQUIPMENT FOR BABIES

Elsie A. Irvine, Philadelphia, Pa.

Application March 25, 1947, Serial No. 736,984

25 Claims. (Cl. 155—41)

The invention relates to a traveling equipment for babies.

An object of the present invention is to provide for babies a traveling equipment collapsible into the form of a traveling bag for enabling it to be conveniently carried and for enabling it to contain all the necessary articles for the care of a baby and articles of personal use for the mother or other attendant and capable of being easily and quickly converted into a chair, swing, jumper, potty chair or commode, hammock, cradle and a carriage by changing and re-arranging with relation to a fabric body portion parts of a supporting framework.

A further object of the invention is to provide an equipment of this character having a supporting framework removable from the fabric body portion and collapsible and foldable compactly to adapt it to be arranged within and carried by the fabric body portion when the latter is converted into a traveling bag.

A further object of the invention is to provide a traveling equipment having a fabric body portion which, when arranged in the form of a traveling bag, will perform all of the functions of an ordinary traveling bag and which will be light in weight, convenient in size and shape and capable of being manufactured at a low cost with a minimum amount of labor and material and equipped with individual or separate pockets for the reception of various articles necessary for a baby's care as well as various other articles of personal and other use of a child's mother, nurse or other attendant.

A primary object of the invention is to provide a traveling bag equipment for babies designed to relieve mothers, nurses and others having the care of a baby, of the worries and strain incident to caring for badies during traveling, excursions, picnics and the like and at the same time afford adequate protection for babies.

Another object of the invention is to provide a fabric body portion of durable, washable and water-repellent material adapted to shed water and capable of being readily removed from and replaceable on a metal framework to provide the various forms in which the equipment may be used.

Another object of the invention is to provide a fabric body portion adapted to be made from a single piece of fabric, foldable to provide a large number of individual pockets with a minimum amount of stitching and fastening devices and without tie-strings or separate additional portions.

It is also an object of the invention to provide a traveling equipment for babies having means for securing a baby in it and provided with an integral hood adapted to shelter a baby when the equipment is used outdoors and capable of being readily collapsed when it is not desired to use the hood.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Figure 1 is a plan view of the blank showing the fold lines, the cuts and some of the lines of stitching;

Figure 2 is a fragmentary plan view showing the upper portion of the blank folded;

Figure 3 is a longitudinal sectional view on the line 3—3 of Figure 2;

Figure 4 is a fragmentary plan view of the upper portion of the blank showing the diagonal folds;

Figure 5 is a transverse sectional view on the line 5—5 of Figure 4;

Figure 6 is a sectional view taken longitudinally of the blank on the line 6—6 of Figure 4;

Figure 7 is a fragmentary plan view of the top portion of the blank illustrating further folds of the same;

Figure 8 is a sectional view taken on the line 8—8 of Figure 7;

Figure 9 is a plan view showing the top portion of the blank completely folded, the upper tabs partially folded and the tongues at the lower portion of the blank folded upwardly;

Figure 10 is a transverse sectional view on the line 10—10 of Figure 9;

Figure 11 is a sectional view on the line 11—11 of Figure 9;

Figure 12 is a detail sectional view on the line 12—12 of Figure 9, illustrating the arrangement of the Zipper;

Figure 13 is a fragmentary plan view of a portion of the blank shown in Figure 9, the upper tab being completely folded;

Figure 14 is a sectional view on the line 14—14 of Figure 13;

Figure 15 is a plan view similar to Figure 13 showing the lower tab folded;

Figure 16 is a sectional view on the line 16—16 of Figure 15;

Figure 17 is a sectional view on the line 17—17 of Figure 15;

Figure 18 is a sectional view on the line 18—18 of Figure 15;

Figure 19 is a sectional view on the line 19—19 of Figure 13;

Figure 20 is a plan view of the blank, the top and the upper and lower flaps being completely folded, with the lower portion of the blank folded transversely;

Figure 21 is a fragmentary view of the bottom portion of the blank showing the diagonal folds;

Figure 22 is a sectional view on the line 22—22 of Figure 21;

Figure 23 is a sectional view on the line 23—23 of Figure 21;

Figure 24 is a plan view of the fabric body portion with the supporting frame inserted;

Figure 25 is a longitudinal sectional view on the line 25—25 of Figure 24;

Figure 26 is a sectional view on the line 26—26 of Figure 24;

Figure 27 is a sectional view on the line 27—27 of Figure 24;

Figure 28 is a sectional view on the line 28—28 of Figure 24;

Figure 29 is a fragmentary section on the line 29—29 of Figure 25 illustrating the connection between the adjacent edges of the side wall sections;

Figure 30 is a perspective view of the supporting frame and associated elements;

Figure 31 is a detail sectional view illustrating the construction of the detachable casters;

Figure 32 is a detail sectional view on the line 32—32 of Figure 24;

Figure 33 is a detail view of a portion of the frame showing the keyhole slots;

Figure 34 is a side elevation showing the equipment suspended in an upright position;

Figure 35 is a side elevation of the equipment in an upright position supported on one end and by the leg member thereat;

Figure 36 is a side elevation of the equipment showing the body portion in the horizontal position to form a cradle, bassinet or the like;

Figure 37 is an end elevation showing the equipment arranged to form a traveling bag.

The blank 1, which may be made of any suitable water-repellent, washable fabric and of any desired dimensions to provide a baby carriage body or the like of the desired size, is provided at opposite sides with cuts or slots 2 extending longitudinally and transversely and terminating short of the approximate center of the blank to divide the blank into upper and lower portions and also to form at opposite sides thereof longitudinal tabs 3 and transversely disposed strap sections 4. The longitudinal tabs 3 are foldable as hereinafter fully explained, to form individual pockets and the strap sections 4 provide straps which in practice will be equipped with suitable fastening devices, such as buckles, snap fasteners or the like, for confining a baby within the equipment when the same is arranged in the several forms adapted for holding a baby. The inner transverse portions 5 of the slots or cuts 2 are tapered inwardly and provide for the strap portions 4 material of sufficient width to enable the strap portions to be folded on themselves longitudinally to form two plies or thicknesses so that the strap portions will have adequate strength for retaining a child in the equipment. However, the strap portions may, as illustrated in the drawings, be hemmed at the edges and may consist of a single ply.

The upper portion of the blank is folded transversely approximately midway between the upper edge of the blank and the center of the same and the sides of the upper folded portion are folded diagonally to form approximately triangular flaps 6 composed of inner and outer layers. The triangular flaps 6, which meet at their lower inner angles at the center of the front of the folded top portion or hood 6ª, are stitched at the said inner angles or corners and provide interiorly and exteriorly arranged pockets. The free marginal portions of the inner layers 7 of the triangular flaps 6 are folded inwardly prior to the folding of the flap 6 to provide inner supplemental flaps 8 which are stitched at 9 from the diagonal fold 10 to the outer margin of the triangular flaps 6. The stitching 9 is, of course, effected prior to the diagonal folding of the flaps 6. The supplemental triangular flaps 8 are arranged at the inner face of the front of the folded top portion of the blank. When the inner lower corners of the triangular flaps 6 are secured to the front of the folded top portion of the blank, interior and exterior pockets 11 and 12 are formed and the outer layers of the triangular flaps 6 have their lower edges 13, formed by the slots 2, arranged to afford convenient access to the exterior pockets.

The hood forms the front wall of the fabric body when the same is arranged in a horizontal position and it serves as a hood or cover when the body is arranged in an upright position. The end wall 14 which is located at the other end of the body provides a seat when the body is arranged in an upright position and when the body is arranged in a horizontal position it extends upwardly from the bottom wall 15 which extends the entire length of the body from the transverse fold of the hood to a transverse fold 16 of the lower portion of the blank. The lower portion of the blank is folded upwardly along the transverse fold line 16 and then diagonally at opposite sides along the fold lines 17 which collapse the lower corner portions of the blank, forming two-ply flaps 18 which are folded inwardly at opposite sides of the end wall 14 and arranged at the inner face of said wall 14. The adjacent side walls 19 are formed by folding or bending the sides of the lower portion of the blank upwardly along the longitudinal fold lines 20. This provides side and end walls at the lower portion of the blank. When the fabric body is arranged in a horizontal position and the bottom wall 14 is horizontal, the side wall sections 19 are arranged approximately upright and have their inner ends arranged adjacent the side portions of the hood. The side portions of the hood and the side wall sections 19 constitute the side walls of the fabric body which may be arranged either in a horizontal position or an upright position to form the body portion of a baby carriage or a hammock, and when the body is arranged in an upright position to form a chair or swing, the lower end wall constitutes a seat.

The lower portion of the blank is cut to form longitudinal tabs 21 which extend above and below the fold line 16, as clearly illustrated in Figure 1 of the drawings, and when the longitudinal tabs are folded inwardly upon the blank the recesses provide leg-receiving openings 22. After the longitudinal tabs are folded inwardly the tongues 23 at the outer side of the leg-receiving openings 22 are bent transversely and are secured at 23ª to the inner upper corners of the triangular flaps 18 and the upper edges of the side wall sections 19 are folded inwardly at 24, defining the height of said side wall sections. The folding of the lower portion of the blank to form the two-ply flaps 18 locates the attached portion 23ª at the longitudinal tab 21 at the inner upper corner of the triangular flap 18. This permits the tongues 23 to be secured at 23ª to the inner upper corners of the triangular flaps 18. The inwardly bent or folded portions 25 extend to the central portion of the fabric body at the top thereof and are detachably connected by a Zipper fastener 26 or other suitable fastening means. When the Zipper is closed the inwardly extending portions 25 form a closed top for the fabric body when the latter is arranged in a horizontal position and when the fabric body is arranged in an upright position they constitute the front wall with the leg-receiving openings 22 at opposite sides of the bottom thereof. When the Zipper is unfastened and the body is in the horizontal position the top inwardly extending Zipper-connected portions may be dropped over the sides of the fabric body and the straps 4 may be used for retaining the baby in the fabric body when the same is either in a horizontal or an upright position and the Zipper is unfastened. Also the Zipper-connected portions may be arranged within the fabric body at either side of the baby.

When the fabric body is arranged in an upright position the end wall 14 is in a horizontal position and constitutes a seat and the two-ply triangular flaps are arranged upon the upper face of the seat and diapers or other soft material may be placed between the folds of the two-ply flaps 18 or under the same or over the same, to afford a soft seat for a baby. The form of the seat is maintained by a rectangular stiffening element 27 (Figs. 25 and 35) which may consist of heavy cardboard or any other suitable stiff material upon which the padding formed by the flaps 18, diapers and the like are placed.

The tabs 3 formed by the slots or cuts 2 are folded transversely on the fold line 29 and then diagonally on the fold line 30, forming laterally extending terminal portions 31 which project laterally beyond the body portion of the tab 3. The folded tabs 3 are then bent or folded downwardly on the transverse fold lines 32 against the inner faces of the transverse Zipper-connected extensions of the side walls of the fabric body. The laterally projecting terminal portions 31 are stitched by parallel lines of stitching 33 which extend from a slot 34 to provide casings for portions of the supporting framework. The tongues 23, which are formed by cuts at the lower corners of the blank, have tapered terminal portions 35 curved at their inner side edges 36 and the tongues are folded on the transverse fold lines 37 to arrange the tapered terminal portions against the inner faces of the transverse extensions of the side walls of the fabric body and to provide tongues 23 of two-ply thickness. The tapered terminal portions 35 are folded back on the fold lines 37 and are stitched at the curved edges 36 to form pockets which are open at one end. The lower tabs 21 are then folded upwardly on the transverse fold lines 39 and are stitched at their side edges for a distance from the fold lines 39 approximately half the length of the lower tabs 21, forming pockets which are adapted to be closed by the free unstitched portions which are detachably secured in closed position by snap fasteners 40.

The folded upper tab 3 is folded along the diagonal fold line to form an inner tapered pocket 42 and the said folded tab 3 is stitched on the fold line 29 to provide a substantially rectangular pocket 43 which is open at the inner side. When the lower tab 21 is folded upwardly and stitched at the side edges at the lower half, it covers the pocket 43 formed by the terminal portion of the tongue 23 and when the end of the tab 21 is unfastened it affords access to the pocket 43ª formed by the lower stitched portion of the said tab 21 and also to the pocket 43.

The hood is maintained in its distended condition and is prevented from collapsing by a curved bar 44 extending across the front portion of the hood from one side of the same to the other side thereof and arranged in casings 45 formed by lines 9 of stitching and lines of stitching 46 arranged in spaced relation to and in substantial parallelism with the lines of stitching 9. The lines of stitching 46 terminate short of the center of the front portion of the hood and the curved bar 44 is exposed centrally of the front portion of the hood interiorly thereof. The casings 45 are open at their outer ends to enable the curved bar to be readily introduced into and removed from the hood. When the hood is not required for the protection of a child within the equipment, it may be collapsed without removing the curved bar, but the bar may be removed from the hood if desired.

When the fabric body is arranged in a horizontal position to form a crib, baby carriage or bassinet, it is supported and held distended by a metal supporting frame composed of bars or members which, while shown in the accompanying drawings as constructed of flat metal strips, may be made of round metal, uncovered or covered by protective material, such as rubber tubing. It may also be constructed of any other suitable material. The supporting frame comprises in its construction a substantially oblong sectional top portion and legs formed by substantially U-shaped members. The sectional top portion is composed of similar U-shaped end members 47 and straight intermediate side members 48. The U-shaped members 47 are composed of parallel side portions 49 and an integral connecting end portion 50. The intermediate connecting members 48 consists of straight bars provided at their outer sides with spring latches 51 pivoted at 52 to enable them to be readily swung upward out of the way in assembling the parts of the sectional top of the supporting frame. The ends of the side portions 49 are detachably secured to the intermediate connecting members at points spaced from the ends thereof by detachable screws 53 or other suitable fastening devices which pierce the connecting bars or members and engage threaded perforations 54 in the ends of the side portions of the U-shaped members 47. After the intermediate connecting members are secured to the side portions of the U-shaped members 47 by the screws 53, the parts are locked in rigid alignment by the latches 51 which consist of strips of spring metal extending longitudinally of the connecting members 48 and secured at their inner ends to the same by the screws 52 and provided at their outer ends with projecting pins 55 which extend through perforations 56 in the side portions of the U-shaped members 47 and engage perforations 57 in the ends of the intermediate connecting members 48. When the intermediate connecting members are detached the U-shaped end members 47 of the top of the frame may be employed for maintaining the end portions of the fabric body in distended rectangular formation. This arrangement of the U-shaped members in the fabric body is employed when the equipment is used as a swing, as hereinafter more fully explained.

The U-shaped members 58 which form the supporting legs of the frame are each constructed of a single piece of metal and consists of vertical legs or side portions 59 and bottom horizontal transverse connecting portions 60. The supporting legs are detachably secured to the side portions 49 of the U-shaped members 50 by means of attaching bars 61 horizontally disposed when in operative position and connected at their outer ends to the upper ends of the legs by pivots 62 and supported at their inner ends by inclined braces 63 extending upwardly and inwardly from the legs at points intermediate the ends thereof and connected at their upper ends to the inner ends of the attaching bars 61 by pivots 64. The lower ends of the braces 63 are detachably connected with the legs 59 by means of pins or studs 65 projecting outwardly from the legs 59 at points intermediate the ends thereof and engaging slots 66 in the lower ends of the inclined braces 63. When the pins 65 are disengaged from the slots 66 of the braces 63 the attaching bars 61 and the braces 63 are adapted to be folded compactly against the legs 59.

The attaching bars 61 are provided at spaced points with keyhole slots 67 engageable with headed studs or pins 68 projecting from the outer faces of the side portions 49 of the U-shaped frame members 47. The keyhole slots permit the attaching bars to be fitted over the heads of the pins or studs 68 and the narrow portions of the keyhole slots permit the attaching bar 61 to be moved longitudinally into engagement with the heads of the pins or studs 68. The side portions 49 are provided at their inner faces with spring latches 69 consisting of strips of spring steel or other suitable material secured at one end to the side portions 49 by pivots 70 and provided at the other end with projecting pins or studs 71 arranged to extend through perforations 72 in the side portions 49 and engage perforations 73 in the attaching bars 61. The pivoting of the latches permits the same to be swung out of the way in assembling the parts and after the parts have been assembled the pins or studs 71 are brought into register with the perforations 72 and 73 and by engaging the same lock the attaching bars or members 61 against longitudinal movement and thereby maintain the attaching bars or members in rigid alignment with the headed fastening devices 68 of the side portions of the U-shaped members 50.

The transverse connecting portions 60 of the supporting legs are adapted to be engaged by clips 74 of rollers or casters 75 designed to be arranged in pairs at the ends of the supporting frame for converting the same into a baby carriage or bassinet.

The sections or members of the top of the supporting frame are arranged in end and side casings 76, 77 and 78 and the end casings have central openings 79 and 80 (Fig. 24) to expose the center portions of the U-shaped members 50 of the top of the supporting frame. The arrangement of the ends and sides of the oblong top of the supporting frame in the end and side casings 76, 77 and 78 securely attached the fabric body to the supporting frame and the fabric body cannot become detached from the supporting frame without separating the intermediate connecting bars from the U-shaped members of the oblong top of said supporting frame which extends along both sides and both ends of the fabric body and enables the fabric body to be supported in either a horizontal or upright position.

The U-shaped members 50 are provided at the center of their transverse portions with flattened areas 81 which are adapted to be arranged in hook-shaped terminals 82 of approximately U-shaped handles 83 which permit the equipment to be readily suspended from a supporting bar 84 or other stationary support for suspending the equipment in an upright position to form a swing. Similar handles may be applied to each end of the top of the supporting frame to form a hammock when the equipment is arranged in a horizontal position. The handle 83 is provided at both its terminals with hooks to enable it to be engaged with the central portions of both of the U-shaped members 50 when the equipment is folded up and arranged in the form of a traveling bag, as illustrated in Figure 37 of the drawings. In folding the equipment to form a traveling bag, the intermediate connecting bars, the legs 58, the attaching bars 61 and the braces 63 are removed from the U-shaped end members 47 and the fabric body is folded transversely at its center, as shown in Fig. 37. The detached pieces of the supporting frame are placed within the folded fabric body and the hooked ends of the U-shaped handle 83 are engaged with the central reduced portions 81 of the transverse portions of the U-shaped end members. This will enable the equipment to be readily carried in the form of a traveling bag. The U-shaped handle will maintain the traveling bag closed and will enable the same to be readily opened when it is desired to obtain access to the interior of the traveling bag.

As illustrated in Figure 34, the equipment is suspended in an upright position to form a swing, a chair or the like, and in Figure 36 the equipment is arranged in a horizontal position to form a cradle, bassinet or baby carriage. When the equipment, as illustrated in Fig. 34, is arranged as a swing and is in an upright position, it is supported at the top by the handle 83 and the lower end of the body which forms a seat for the child is located above the ground or other surface and the equipment is adapted to swing back and forth. When the equipment is arranged in a horizontal position to form a cradle, bassinet or the like, as illustrated in Fig. 36 of the drawings, the fabric body is supported at its ends by the legs 58 and the oblong top of the supporting frame rigidly connected to the legs supports the fabric body and maintains the sides and ends thereof in proper position. In these figures the intermediate portions of the top of the supporting frame are concealed within the side casings and the end portions of the top of the supporting frame are exposed at the ends of the equipment. In Figure 35 the legs at the upper end of the equipment are removed and the equipment is supported in an upright position by the lower end portion of the top of the supporting frame and also by the legs at that end of the equipment. A suitable weight 85 may be located above the outer portions of the lower legs. This may in practice be a piece of furniture or any other heavy object which will maintain the equipment firmly in an upright position. When the equipment is arranged in an upright position, as illustrated in Fig. 35 of the drawings, it is inclined slightly upwardly and rearwardly to elevate the front portion of the seat above the supporting surface sufficiently to permit the legs of the child to hang from the front of the seat, or the position of the equipment may be such as to permit the feet of the child to rest upon the floor or other supporting surface. When the legs 58 at the lower end of the supporting frame are anchored, the oblong top portion of the supporting frame and the fabric body will be firmly maintained in an upright position as said lower end legs 58 are rigidly connected with the lower portions of the sides of the oblong top portion of the frame.

When the equipment is used as a hammock the legs at both ends of the supporting frame are removed and a handle is applied to each end of the supporting frame and is suspended by any suitable means.

As illustrated in Figure 29 of the drawings, the adjacent edges 86 and 87 of the side wall sections are connected by suitable stitching 88 and 89 or other siutable fastening means to take up any fullness at the side walls of the fabric body. The edges 86 and 87 are arranged interiorly of the fabric body which presents a smooth exterior.

The equipment may be arranged in an upright position with the legs removed and a pair of handles attached to the upper end of the equipment. The equipment may then be conveniently carried on the back of a person on a hike by passing the arms through the pair of handles.

I claim:

1. A traveling equipment for babies including a fabric body having bottom, side and end walls and formed from a blank of sheet material, one of the end walls being formed by folding the blank transversely and diagonally on opposite sides providing triangular flaps composed of inner and outer layers and connected at the inner corners with the end wall providing interiorly and exteriorly arranged pockets, the inner layers of the triangular flaps being extended inwardly at the inner face of the contiguous end wall and secured to the same providing additional pockets.

2. A traveling equipment for babies including a fabric body having bottom, side and end walls and formed from a blank of sheet material, one of the end walls being formed by folding the blank transversely and diagonally on opposite sides providing triangular flaps composed of inner and outer layers and connected at the inner corners with the end wall providing interiorly and exteriorly arranged pockets, the inner layers of the flaps being secured to said end wall and the outer layers of the flaps being cut away to provide entrances to the exterior pockets.

3. A traveling equipment for babies including a fabric body having bottom, side and end walls and formed from a blank of sheet material, one of the end walls being formed by folding the blank transversely and collapsing the corner portions of the blank providing two-ply triangular flaps arranged upon the inner face of said end wall and forming pockets located between the layers of the triangular flaps, the triangular flaps being secured to said end wall and being free intermediate of the ends of the diagonal folds forming retaining means for holding articles on the end wall when the equipment is arranged in an upright position and said end wall constitutes a seat.

4. A traveling equipment for babies including a fabric body having bottom, side and end walls and formed from a blank of sheet material, one of the end walls being formed by folding the blank transversely and collapsing the corner portions of the blank providing two-ply triangular flaps arranged upon the inner face of said end wall and forming pockets located between the layers of the triangular flaps, the triangular flaps being secured to said end wall and being free intermediate of the ends of the diagonal folds forming retaining means for holding articles on the end wall when the equipment is arranged in an upright position and said end wall constitutes a seat, and a substantially rectangular stiffening element arranged on the inner face of said end wall and extending between the same and the triangular flaps.

5. A traveling equipment for babies including a fabric body having bottom, side and end walls and formed from a blank of sheet material, one of the end walls being formed by folding the blank transversely and the folded portion folded diagonally at opposite sides to provide triangular pocket-forming flaps, and a bowed member detachably connected with the said end wall and maintaining the same in a distended position to form a hood.

6. A traveling equipment for babies including a fabric body having bottom, side and end walls and formed from a blank of sheet material, one end wall of the body being formed by folding the blank transversely and diagonally to provide pocket-forming flaps, the other end wall of the body being formed by folding the blank transversely and collapsing the corner portions to form triangular flaps at the inner face of the last mentioned end wall, the side walls adjacent the latter being provided with flaps extending inwardly from the side walls of the body and having meeting edges detachably connected together centrally of the body, said flaps extending longitudinally of the body from the central portion to one end thereof, said body being provided adjacent the last mentioned end wall with leg-receiving openings and the end wall thereat being provided with a stiffening member to form a seat, and a curved member connected with the other end wall and maintaining the same in a distended position to provide a hood.

7. A traveling equipment for babies including a fabric body having bottom, side and end walls and formed from a blank of sheet material, said body being provided at opposite sides with flaps extending inwardly from the side walls of the body and having meeting edges provided with fastening means for detachably connecting them together and an upper tab foldable on a transverse fold line against the inner face of one of the flaps and folded upon itself on transverse and diagonal fold lines and secured at the fold lines to provide a transversely disposed tapered pocket and a substantially rectangular longitudinal pocket.

8. A traveling equipment for babies including a fabric body having bottom, side and end walls and formed from a blank of sheet material, said body being provided at opposite sides with flaps extending inwardly from the side walls of the body and having meeting edges provided with fastening means for detachably connecting them together and an upper tab foldable on a transverse fold line against the inner face of one of the flaps and folded upon itself on transverse and diagonal fold lines and secured at the fold lines to provide a transversely disposed tapered pocket and a substantially rectangular longitudinal pocket, the diagonally folded portion being extended inwardly beyond the inner edge of the tab and having parallel rows of stitching forming a casing for the reception of a frame element.

9. A traveling equipment for babies including a fabric body having bottom, side and end walls and formed from a blank of sheet material, said body being provided at opposite sides with flaps extending inwardly from the side walls of the body and having meeting edges provided with fastening means for detachably connecting them together, upper tabs foldable against the inner faces of the flaps on transverse and diagonal lines to provide tapered and rectangular pockets, lower tabs foldable upwardly at the inner faces of said flaps and secured at their edges to provide longitudinal pockets and having free terminal portions adapted to be secured detachably to the body to provide closures for said pockets.

10. A traveling equipment for babies including a fabric body having a bottom, side and end walls and a supporting frame for said body comprising a horizontal top portion and end legs, the top portion being composed of substantially U-shaped end members and straight intermediate connecting members detachably secured to the end members at opposite sides thereof, the members of the top portion being removably attached to the fabric body at the sides and ends thereof, the legs and the intermediate members being removable to permit the collapsing of the fabric body to form a bag.

11. A traveling equipment for babies including a fabric body having a bottom, side and end walls, a supporting frame comprising a substantially oblong top portion connected to the sides and ends of the body, and leg members located at the ends of the top portion of the frame, attaching bars disposed longitudinally of the top portion of the frame and pivoted at their outer ends to the upper ends of the leg members, inclined braces pivoted to the inner ends of the attaching bars and detachably secured at their lower ends to the leg members and means for detachably interlocking the attaching bars to the sides of the top portion of the supporting frame.

12. A traveling equipment for babies including a fabric body having bottom, side and end walls and collapsible and foldable transversely and approximately centrally thereof to form a bag, frame members extending across and secured to the fabric body at the ends thereof, and a substantially U-shaped handle having terminal means for detachably engaging the frame members to form a handle for the bag.

13. A traveling equipment for babies including a fabric body having bottom, side and end walls, one of the end walls being provided with triangular flaps composed of inner and outer layers connected together at their inner side edges and the inner layers of the triangular flaps being connected at their outer side edges with said end wall at the outer side edges thereof, said flaps being attached at their inner lower corners to said end wall and providing with said end wall inner and outer pockets opening respectively at the inner sides and bottom of said triangular flaps.

14. A traveling equipment for babies including a fabric body having bottom, side and end walls, one of the end walls being provided with triangular flaps composed of inner and outer layers connected together at their inner side edges and the inner layers of the triangular flaps being connected at their outer side edges with said end wall at the outer side edges thereof, said flaps being attached at their inner lower corners to said end wall and providing with said end wall inner and outer pockets opening respectively at the inner sides and bottom of said triangular flaps, the inner layers of the triangular flaps being extended inwardly at the inner face of the contiguous end wall and secured to the same, providing additional pockets.

15. A traveling equipment for babies including a fabric body having bottom, side and end walls, one of the end walls being provided with triangular flaps composed of inner and outer layers connected together at their inner side edges and the inner layers of the triangular flaps being connected at their outer side edges with said end wall at the outer side edges thereof, said flaps being attached at their inner lower corners to said end wall and providing with said end wall inner and outer pockets opening respectively at the inner sides and bottom of said triangular flaps and the outer layers of the flaps being cut away at the bottom to provide entrances to the outer pockets.

16. A traveling equipment for babies including a fabric body having bottom, side and end walls, one of the end walls being provided with two-ply triangular flaps arranged upon the inner face of said end wall and providing pockets located between the layers of the triangular flaps, the triangular flaps being secured to said end wall and being free intermediate their ends forming retaining means for holding articles on the end wall when the equipment is arranged in an upright position and said end wall constitutes a seat, and a substantially rectangular stiffening element arranged on the inner face of said end wall and extending between the same and the triangular flaps.

17. A traveling equipment for babies including a fabric body having bottom, side and end walls, one end wall of the body being provided with pocket-forming flaps, the other end wall of the body being provided at its inner face with triangular flaps, the side walls being provided adjacent the last mentioned end wall with flaps extending inwardly from said side walls and having detachably connected meeting edges disposed centrally of the body and the latter being provided adjacent said last mentioned end wall with leg-receiving openings and said last mentioned end wall being provided with a stiffening member to form a seat, and a curved member connected with the other end wall and maintaining the same in a distended position to provide a hood.

18. A traveling equipment for babies including a fabric body having bottom, side and end walls, said body being provided at opposite sides with flaps extending inwardly from said side walls and having meeting edges, fastening means for detachably connecting the meeting edges, and an upper folded tab arranged at the inner face of one of the side flaps and secured to the same and providing a transversely disposed tapered pocket and a substantially rectangular longitudinal pocket.

19. A traveling equipment for babies including a fabric body having bottom, side and end walls, said body being provided at opposite sides with flaps extending inwardly from said side walls and having meeting side edges, fastening means for detachably connecting the meeting edges of the side flaps together, and an upper folded tab arranged at the inner face of one of the side flaps and providing a transversely disposed tapered pocket and a substantially rectangular longitudinal pocket, and provided with a portion extended inwardly beyond the inner edge of the tab and having parallel rows of stitching providing a casing for the reception of a frame element.

20. A traveling equipment for babies including a fabric body having bottom, side and end walls, said body being provided at opposite sides with flaps extending inwardly from the side walls and having meeting side edges, fastening means detachably connecting the meeting side edges together, upper folded tabs arranged at the inner faces of the side flaps and providing tapered and rectangular pockets, lower folded tabs also located at the inner faces of said side flaps and secured at their edges to provide longitudinal pockets and having free terminal portions forming closures for the last mentioned longitudinal pockets.

21. A traveling equipment for babies including a fabric body having bottom, side and end walls, said body being provided at opposite sides with flaps extending inwardly from the side walls and having meeting side edges, fastening means detachably connecting the meeting edges of the side flaps, upper folded tabs arranged against the inner faces of the side flaps and providing tapered and rectangular pockets, lower folded tabs also located at the inner faces of said side flaps and secured at their edges to provide longitudinal pockets and having free terminal portions forming closures for said last mentioned longitudinal pockets, said body being provided with leg-receiving openings, narrow longitudinal tongues located adjacent the leg-receiving openings and provided with enlarged terminal portions secured to the body at the inner faces of the flaps and providing pockets, said tongues being attached to the body at their outer ends and defining the contour of the leg-receiving openings at the outer sides thereof.

22. A convertible article of traveling equipment for babies, in the form of a traveling bag adapted to contain various separate and individual articles for personal and other uses and to be readily converted into various individual forms of supports for the infant, comprising a collapsible foldable supporting frame consisting of U-shaped sections, the legs of each of which sections are pivotally connected together adjacent their ends and each section including a base portion, a hollow flexible fabric body carried by the frame, a substantially U-shaped supporting member connected to opposite sides of each of the legs of the U-shaped sections of the frame adjacent the base portions thereof and when in supporting position extending substantially at a right angle thereto, substantially U-shaped handle members adapted to be connected to the base portions of the frame sections, so that the frame with the cover thereon and with the supporting members disposed within the cover may be folded into the form of a traveling bag and with the handle members connected to the base of each section for carrying same, the frame sections with the fabric body thereon when extended and arranged vertically and suspended by one of the said handle members connected to a base of a frame section forming a swing and jumper, also when vertically disposed and supported forming a chair, and the frame with the fabric body thereon when arranged in a substantially horizontal plane with the U-shaped supporting members extending downwardly from the frame forming a crib.

23. The traveling equipment as defined in and by claim 10 wherein the fabric body is wholly removable from the supporting frame.

24. The traveling equipment as defined in and by claim 12 wherein the fabric body is wholly removable from the frame members.

25. The convertible article of traveling equipment as defined in and by claim 22 wherein the flexible fabric body is wholly removable from the frame.

ELSIE A. IRVINE.

REFERENCES CITED

The following references are of record in the file of this patent:

UNITED STATES PATENTS

| Number | Name | Date |
|---|---|---|
| 621,824 | Kleeman | Mar. 28, 1899 |
| 823,321 | Dejonge | June 12, 1906 |
| 954,421 | Connery | April 12, 1910 |
| 1,105,156 | Oliphant | July 28, 1914 |
| 1,225,208 | Bailey | May 8, 1917 |
| 1,237,628 | Ford | Aug. 21, 1917 |
| 1,530,116 | Hawkins | Mar. 17, 1925 |
| 1,403,552 | Holmes | Jan. 17, 1922 |
| 1,538,538 | Wood | May 19, 1925 |
| 2,036,175 | Hollander | Mar. 31, 1936 |
| 2,253,024 | Farrand | Aug. 19, 1941 |
| 2,324,665 | Ayers | July 20, 1943 |
| 2,378,434 | Robinson | June 19, 1945 |
| 2,459,445 | McClintock et al. | Jan. 18, 1949 |
| 2,488,225 | Mover | Nov. 15, 1949 |
| 2,496,216 | Kaminski | Jan. 31, 1950 |

FOREIGN PATENTS

| Number | Country | Date |
|---|---|---|
| 141,106 | Australia | Mar. 25, 1935 |
| 760,745 | France | Dec. 27, 1933 |
| 768,344 | France | May 14, 1934 |